United States Patent [19]

Dick

[11] Patent Number: 4,722,955

[45] Date of Patent: Feb. 2, 1988

[54] THERMALLY STABLE CARBONATE POLYMER COMPOSITION

[75] Inventor: Kevin F. Dick, Lake Jackson, Tex.

[73] Assignee: The Dow Chemical Company, Midland, Mich.

[21] Appl. No.: 723,592

[22] Filed: Apr. 15, 1985

[51] Int. Cl.$^4$ ............................ C08K 5/06; C08K 5/15
[52] U.S. Cl. ..................................... 524/109; 524/101; 524/108; 524/114; 524/133; 524/135; 524/141; 524/151; 524/154; 524/291; 524/342; 524/343; 524/539; 524/540
[58] Field of Search ............... 524/109, 114, 537, 101, 524/108, 114, 133, 135, 141, 151, 154, 291, 342, 343, 539, 540; 525/394, 396, 463, 469, 470

[56] References Cited

U.S. PATENT DOCUMENTS

| | | | |
|---|---|---|---|
| 3,634,312 | 1/1972 | Babillis et al. | 524/109 |
| 3,859,248 | 1/1975 | Bialous et al. | 529/109 |
| 3,880,799 | 4/1975 | Hoogeboom | 524/109 |
| 3,978,020 | 8/1976 | Liberti | 524/109 |
| 4,066,611 | 1/1978 | Axelrod | 524/114 |
| 4,076,686 | 2/1978 | Calkins | 524/109 |
| 4,145,329 | 3/1979 | Mark et al. | 524/114 |
| 4,556,681 | 12/1985 | Liberti et al. | 524/109 |

FOREIGN PATENT DOCUMENTS

| | | | |
|---|---|---|---|
| 2206720 | 8/1973 | Fed. Rep. of Germany | 524/109 |
| 3041298 | 5/1981 | Fed. Rep. of Germany | 524/114 |

*Primary Examiner*—John Kight
*Assistant Examiner*—Kriellion Morgan

[57] ABSTRACT

Carbonate polymer compositions exhibit good thermal stability and good non-yellowing characteristics. Compositions comprise a carbonate polymer (e.g., a homopolycarbonate of bisphenol A), a heat stabilizing phosphorous compound (e.g., an organo-phosphite or an organo-phosphonite), an epoxy compound containing internal acyclic ether linkages (e.g., a diglycidyl ether of a polypropylene glycol), and optionally a hindered phenol. Such compositions retain desirable properties upon exposure to hot and humid conditions.

11 Claims, No Drawings

THERMALLY STABLE CARBONATE POLYMER COMPOSITION

BACKGROUND OF THE INVENTION

This invention relates to carbonate polymer compositions containing additives which act as thermal stabilizers.

Carbonate polymers derived from reactions of dihydroxyorganic compounds, particularly the dihydric phenols, and carbonic acid derivatives such as phosgene, have found extensive commercial application because of their excellent physical properties. These thermoplastic polymers are suitable for the manufacture of molded parts wherein impact strength, rigidity, toughness, heat resistance and excellent electrical properties are required.

In attempts to increase the desirable properties of carbonate polymers, it is common practice to incorporate therein numerous stabilizers. For example, organo-phosphite and organo-phosphonite compounds are useful as molecular weight stabilizers. As described in U.S. Pat. No. 4,360,617; hindered phenolic compounds can be employed with organo-phosphorus compounds in an attempt to enhance both the molecular weight stability and color stability of carbonate polymers. Unfortunately, the color stability of such compositions is not as great as would be desirable, especially when the carbonate polymer is subjected to warm and moist conditions.

The use of epoxide compounds in retarding the formation of haze and brittleness in carbonate polymers which are exposed to steam is disclosed in U.S. Pat. No. 3,839,247. Unfortunately, such compositions exhibit undesirable color stability as is evidenced by yellowness of the carbonate polymer composition.

In view of the deficiencies of the prior art, it would be highly desirable to provide a carbonate polymer composition which will exhibit good optical properties, improved optical stability at high temperatures, and improved retention of properties under hot and humid environments.

SUMMARY OF THE INVENTION

The present invention is a carbonate polymer composition comprising a carbonate polymer having dispersed therein, in an amount sufficient to provide an effective amount of optical stability to said carbonate polymer composition, an additive comprising (a) a heat stabilizing phosphorus compound, (b) an epoxy compound containing internal acyclic ether linkages, and optionally, (c) a hindered phenolic compound.

In another aspect, the invention is a carbonate polymer composition comprising a carbonate polymer containing phosphorus polymerized in the polymer backbone thereof and having dispersed therein in an amount sufficient to provide an effective amount of optical stability to said composition, an additive comprising (a) an epoxy compound containing internal acyclic ether linkages, and optionally (b) a hindered phenolic compound.

The stabilized carbonate polymer compositions of the present invention are suitably employed in most applications in which polycarbonates have been previously utilized. Applications of particular interest for the utilization of the said carbonate polymer compositions of this invention are as follows: automobile parts, e.g., air filters, fan housings, exterior components, housings for electrical motors, appliances, business and office equipment, and photographic equipment, lighting and aircraft applications.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731; 4,330,662; 4,360,656; 4,374,973; 4,225,556; 4,388,455; 4,355,150; and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

Particularly useful are the carbonate polymers disclosed in U.S. Pat. No. 4,444,978. Such carbonate polymers contain phosphorous polymerized in the polymer backbone.

Heat stabilizing phosphorus compounds are preferably organo-phosphorus compounds which include the organo-phosphates, the organo-phosphonites, the organo-phosphines and the organo-phosphites. Preferred organic phosphorus compounds are those represented by the formulae:

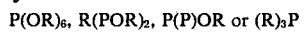

P(OR)₃, R(POR)₂, P(P)OR or (R)₃P wherein R is independently unsubstituted or substituted monovalent aryl, alkyl, cycloalkyl, aralkyl, or alkaryl radicals containing one or more carbon atoms. Suitable organo-phosphorus compositions are disclosed in U.S. Pat. Nos. 4,066,611; 4,073,769; 4,076,686; 4,088,709; 4,427,813; and 4,254,014.

Epoxy compounds containing internal acyclic ether linkages are those compounds which comprise at least one epoxy functionality and at least two internal ether linkages. Preferably, the epoxy compounds are based upon polyglycol starting materials. Especially preferred epoxy compounds are the polyglycidyl ether compounds containing internal acyclic ether linkages, of which the diglycidyl ether compounds are most preferred. Examples of the diglycidyl ether compounds useful in this invention include those compounds represented by the formula:

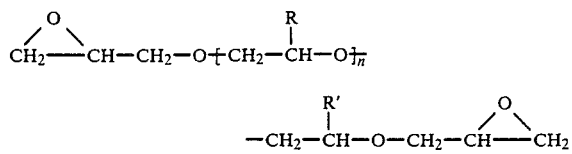

wherein R and R' are individually hydrogen or aliphatic groups, and n is a number having an average value of from about 1 to about 200.

Representative hindered phenolic compounds which are useful herein include single 2,6-disubstituted phenols such as 2,6-di-tert-butyl-4-methyl-phenol or 2,6-di-tert-butyl-4-methoxyphenol; bisphenols such as 2,2'-methylene-bis-(6-tert-butyl-4-ethylphenol), 1,1,3-tris(5-tert-butyl-4-hydroxy-2-methylphenyl)butane, 1,1,5,5-tetra(5-tert-butyl-4-hydroxy-2-methylphenyl)pentane, or ethylene glycol-bis-[3,3-bis(3'-(3'-tert-butyl-4'-hydroxyphenyl)-butyrate]; hydroxybenzyl compounds such as 2,2-bis-(3,5-di-tert-butyl-4-hydroxybenzyl)-malonic acid-di-octadecyl ester or 1,3,5-tris-(3,5-di-tert-butyl)-4-hydroxybenzyl)-isocyanurate; esters of $\beta$-(3,5-di-tert-butyl-4-hydroxyphenyl)propionic acid with alcohols such as octadecanol or pentaerythritol; spiro compounds such as 3,9-bis-(3,5-di-tert-butyl-4-hydroxyphenyl)-2,4,8,10-tetraoxaspiro-[5,5]-undecane. Some particular examples of the above are 1,3,5-tris-(3,5-di-tert-butyl-4-hydroxybenzyl)-2,4,6-trimethylbenzene or 3,9-bis[1,1-dimethyl-2-(3,5-di-tert-butyl-4-hydroxyphenyl)-ethyl]-2,4,8-tetraoxaspiro-[5,5]-undecane.

The additives of this invention can comprise any amount of the aforementioned components in an effective combination which will provide to the carbonate polymer improved optical stability, and preferably improved retention of physical properties under hot and humid environments such as is provided by steam. Most preferred additive compositions comprise from about 100 to about 10,000, preferably from about 300 to about 3,000 ppm phosphorus compound; from about 100 to about 10,000, preferably from 500 to about 5,000 ppm epoxy compound containing internal acyclic ether linkages, and from 0 to about 5,000, preferably from about 100 to about 2,000 ppm hindered phenolic compound. (All amounts are based on the weight of the carbonate polymer.)

In applications wherein the phosphorus compound is provided primarily in the form of, for example, a polycarbonate-co-phosphite or polyester/polycarbonate-co-phosphite as taught in U.S. Pat. No. 4,444,978; the amount of phosphorus which is employed is generally present in the polymerized form and generally ranges from about 10 to about 5,000, preferably from about 50 to about 2,000 ppm (based on the amount of phosphorus containing monomer which is polymerized into the polymer and based on the weight of the polymer). If desired, the composition can comprise an effective amount of the aforementioned phosphorous compound.

The carbonate polymer compositions of the present invention are suitably prepared by combining the carbonate polymer with an effective amount of additive using any of a variety of blending procedures conventionally employed for incorporating additives into carbonate polymer resins. For example, dry particulates of the carbonate polymer and the additive can be dry blended and the resulting dry blend extruded into the desired shape. By "effective amount" is meant that combination of the desired thermal stabilizing additive components sufficient to provide improved character to the carbonate polymer with which it is blended.

In addition to the aforementioned additives, other additives can be included in the carbonate polymer composition of the present invention such as fillers (i.e., a tetrafluoroethylene polymer or glass fibers), pigments, dyes, antioxidants, stabilizers, ultraviolet light absorbers, mold release agents and other additives commonly employed in carbonate polymer compositions.

The following examples are given to further illustrate the invention and should not be construed as limiting its scope. In the following examples, all parts and percentages are by weight unless otherwise indicated.

EXAMPLE 1

To a 1,500 grams (g) sample of a bisphenol A polycarbonate resin which contains 0.075 percent tetrakis(2,4-di-t-butylphenyl)4,4'-biphenylene diphosphonite is added 1.5 g of the diglycidyl ether of a polypropylene glycol having an average starting molecular weight of 400. The mixture is combined using high speed turbulent agitation for about 10 minutes. The mixture is dried at 125° C. for 4 hours and compounded at 575° F. using a single screw extruder, and the resulting strand is comminuted into pellets. The pellets are molded at 575° F. into 2 inch diameter by 0.125 inch thick discs for suitable testing. The sample is designated as Sample No. 1.

Yellowness of the discs are determined after the disc is formed (i.e., for an initial yellowness index value) and after aging a sample in a convection oven for 500 hours at 140° C. (i.e., for a yellowness index value after aging). Discs are tested for yellowness at room temperature in accordance with ASTM D-1925.

The samples are evaluated for percent light transmittance initially and after aging. Discs are tested in accordance with ASTM D-1003.

Melt flow rate of the sample is evaluated in accordance with ASTM D-1238, condition "0". Samples are evaluated before and after exposure to humid (i.e., aging) conditions for 24 hours at 125° C. and 18 psi steam in an autoclave. Prior to evaluation the sample is subjected to drying overnight at 125° C. in a convection oven.

For comparison purposes is prepared and evaluated a carbonate polymer composition containing 0.075 percent of the diphosphonite compound but not containing the diepoxide additive. The sample is designated as Sample No. C-1. Data concerning the properties of the samples are presented in Table I.

TABLE I

| Sample | Yellowness Index | | Percent Light Transmittance | | Melt Flow Rate (gm/10 min) | |
|---|---|---|---|---|---|---|
| | Initial | After Aging | Initial | After Aging | Initial | After Aging |
| 1 | 3.5 | 4.9 | 90.1 | 89.9 | 3.0 | 5.1 |
| C-1* | 3.5 | 6.8 | 90.0 | 89.2 | 3.2 | 8.0 |

*Not an example of the invention.

The data in Table I illustrate that the sample of the invention exhibits improved color stability and improved clarity after heat aging while maintaining good initial optical properties. The data illustrate improved retention of molecular weight after exposure to hot and humid conditions of the sample of the invention.

Comparative samples are prepared ad evaluated as follows: to 1668 g of a bisphenol-A polycarbonate resin containing 0.0536 percent of tetrakis(2,4-di-t-butylphenyl)4,4'-biphenylene diphosphonite is added 1.83 g of epoxidized soybean oil. The subsequent formulated thermoplastic polymer is mixed by high speed turbulent agitation for five minutes. After drying at 125° C. for three hours, the sample is compounded at 575° F. by single screw extruder into a strand, which is granulated. A portion of the sample is molded at 575° F. into optical test discs two inches in diameter by one-eighth inch in thickness. The sample is designated as Sample No. C-2. As a control, the phosphorus color stabilizer containing resin with no epoxidized soybean oil is subjected to the same protocol. This sample is designated as Sample No. C-3. The discs are tested for yellowness in accordance with ASTM-D-1925. After convection oven aging for 500 hours at 140° C., the samples are retested for yellowness. In each case, the yellowness index test is run at room temperature. Data is presented in Table II.

TABLE II

| Sample | Yellowness Index | |
|---|---|---|
| | Initial | After 500 Hours at 140° C. |
| C-2 | 3.0 | 5.6 |
| C-3* | 3.8 | 6.5 |

*Not an example of the invention.

The data in Table II indicate that the sample containing epoxidized soybean oil has higher initial color and no significant improvement in color stability upon thermal aging.

EXAMPLE 2

To a 1596.4 g sample of a carbonate polymer resin are added 1.2 g of octadecyl-3,5-di-tert-butyl-4-hydroxyhydrocinnamate, and 2.4 g of the diepoxide described in Example 1. The carbonate polymer resin is a polycarbonate-co-phosphite based on polymerized bisphenol A, phosgene, and 4,4'-isopropylidenediphenol neodol 25 alcohol phosphite prepared as taught in U.S. Pat. No. 4,444,978, and having an elemental phosphorus content of from 0.00087 to 0.00092 percent as determined by atomic emission. The sample is tumble blended for 1 hour, compounded on a single screw extruder at 500° F. to 600° F., and the strand is granulated. Samples are molded to form optical discs as described in Example 1. The sample is designated as Sample No. 2.

For comparison purposes is prepared a similar composition but which does not include the diepoxide additive. The sample is designated as Sample No. C-4.

Each of the samples are evaluated for yellowing and melt flow as described in Example 1. Data concerning the properties of the samples are presented in Table III.

TABLE III

| Sample | Yellowness Index | | | Melt Flow | |
|---|---|---|---|---|---|
| | Initial | After Aging at 140° C. | After Aging at 125° C. 18 psi steam | Initial | After Aging |
| 2 | 4.0 | 4.6 | 6.4 | 8.3 | 10.7 |
| C-4* | 3.8 | 4.9 | 8.0 | 7.4 | 14.1 |

*Not an example of the invention.

The data in Table III illustrate the improved retention of molecular weight and improved yellowness of the sample of this invention.

What is claimed is:

1. A carbonate polymer composition comprising a carbonate polymer having dispersed therein, in an amount sufficient to provide an effective amount of stability to said carbonate polymer composition, an additive comprising (a) a heat stabilizing organo-phosphorus compound, (b) an epoxy compound containing internal acyclic ether linkages and being represented by the formula:

$$CH_2\overset{O}{\diagup\diagdown}CH-CH_2-O+CH_2-\overset{R}{\underset{|}{C}H}-O+_{\overline{n}}$$

$$-CH_2-\overset{R'}{\underset{|}{C}H}-O-CH_2-CH\overset{O}{\diagup\diagdown}CH_2$$

wherein R and R' are individually hydrogen or aliphatic groups, and n is a number having an average value of from about 1 to about 200, and optionally, (c) a hindered phenolic compound.

2. A carbonate polymer composition comprising a carbonate polymer containing phosphorus polymerized in the polymer backbone thereof and having dispersed therein in an amount sufficient to provide an effective amount of stability to said composition, an additive comprising (a) an epoxy compound represented by the formula:

$$CH_2\overset{O}{\diagup\diagdown}CH-CH_2-O+CH_2-\overset{R}{\underset{|}{C}H}-O+_{\overline{n}}$$

$$-CH_2-\overset{R'}{\underset{|}{C}H}-O-CH_2-CH\overset{O}{\diagup\diagdown}CH_2$$

wherein R and R' are individually hydrogen or aliphatic groups, and n is a number having an average value of from abut 1 to about 200.

3. The carbonate polymer composition of claim 1 wherein said carbonate polymer is a homopolycarbonate of bisphenol A.

4. The carbonate polymer composition of claim 1 wherein said organo-phosphorous compound is an organo-phosphite or an organo-phosphonite.

5. The carbonate polymer composition of claim 1 wherein said epoxy compound is a polyglycidyl ether compound.

6. The carbonate polymer composition of claim 5 wherein said polyglycidyl ether compound is a diglycidyl ether.

7. The carbonate polymer composition of claim 1 which composition comprises from about 100 ppm to about 10,000 ppm of said phosphorous compound, from about 100 ppm to about 10,000 ppm of said epoxy compound, and from 0 ppm to about 5,000 ppm of said hindered phenolic compound, based on the weight of said carbonate polymer.

8. The carbonate polymer composition of claim 2 wherein said epoxy compound is a polyglycidyl ether compound.

9. The carbonate polymer composition of claim 8 wherein said polyglycidyl ether compound is a diglycidyl ether.

10. The carbonate polymer composition of claim 2 which further comprises an effective amount of a heat stabilizing phosphorous compound.

11. The carbonate polymer composition of claim 2 which composition comprises from about 10 ppm to about 5,000 ppm phosphorous containing monomer which is polymerized into the polymer and based on the weight of the polymer.

* * * * *

UNITED STATES PATENT AND TRADEMARK OFFICE
CERTIFICATE OF CORRECTION

PATENT NO. : 4,722,955
DATED : February 2, 1988
INVENTOR(S) : Kevin F. Dick

It is certified that error appears in the above—identified patent and that said Letters Patent is hereby corrected as shown below:

Column 2, line 37, "incorported" should read --incorporated--.

Column 2, line 49, "$P(OR)_6$, $R(POR)_2$, $P(P)OR$ or $(R)_3P$" should read --$P(OR)_3$, $R\text{-}P(OR)_2$, $R_2P\text{-}OR$ or $(R)_3P$--.

Column 3, line 19, "glycol-bis-[3,3-bis(3'-(3'-tert-butyl--4'-hydroxy-" should read -- glycol-bis-[3,3-bis(3'-tert-butyl-4'--hydroxy- --.

Signed and Sealed this

Twenty-second Day of November, 1988

Attest:

DONALD J. QUIGG

*Attesting Officer*      *Commissioner of Patents and Trademarks*